United States Patent [19]
Conger

[11] Patent Number: 5,456,479
[45] Date of Patent: Oct. 10, 1995

[54] TRUCK ACCESS STEP

[76] Inventor: Ronald S. Conger, 1700 W. 2700 North, No. 205, Ogden, Utah 84404

[21] Appl. No.: 265,783

[22] Filed: Jun. 27, 1994

[51] Int. Cl.$^6$ .................................................. B60R 3/02
[52] U.S. Cl. ............................................ 280/165; 280/166
[58] Field of Search ................................. 240/165, 166, 240/169; 182/91, 92, 93, 96, 150, 206

[56] References Cited

U.S. PATENT DOCUMENTS 4,947,961  8/1990  Dudley .................................. 280/165
5,133,429  7/1992  Densley ................................. 280/165

Primary Examiner—Richard M. Camby

[57] ABSTRACT

A compactable access step for use with vehicles to make it easier for a person to reach into the engine compartment and radiator compartment of the vehicle and including a platform for a user to stand on and support means allowing the vehicle to be suspended from either a vehicle bumper or a vehicle wheel.

4 Claims, 2 Drawing Sheets

TRUCK ACCESS STEP

BACKGROUND OF THE INVENTION

1. Field of the Invention

This invention relates to removable steps that attach to vehicle components as a means of providing easier access to the engine compartment of the vehicle.

2. State of the Art

Some vehicles, particularly four-wheeled drive pick-up trucks are structured to provide a high ground clearance and to have large, wide fenders and large radiators and radiator compartments that make it difficult to access the engine compartment and the radiator compartment while standing on the ground at the side of or in front of the vehicle.

In the past an attachable step has been proposed that can be mounted on a vehicle front wheel and that will then support a platform on which a user may stand to have easier access to the engine compartment from one side of the vehicle. This known support unit includes hooked arms that extend over the top of the wheel and the platform carried by the hooked arms to extend from the wheel to provide support for a user standing thereon.

However, the attachable step unit with which I am familiar, while assisting a user in reaching into an engine compartment from a side of the vehicle does not allow a user to have easier access to the vehicle engine compartment or radiator compartment from the front of the vehicle.

Furthermore, the attachable step with which I am familiar does not also fold into a substantially flat package that can be easily stored, for example, beneath the front seat of the vehicle.

While particularly suited for use by the operator of a four-wheeled drive pick-up truck, the truck access step of the present invention may be useful also for mechanics, service station operators and others working in automobile repair shops, or to others needing better access to the engine compartment and radiator compartment of a vehicle. Also, while particularly suited for use with four-wheel drive pick-up trucks having a high ground clearance, the step of the invention is also very useful with other pick-up trucks having a somewhat lower ground clearance it can also be used with some other vehicles, including larger trucks, vans, buses and some passenger vehicles.

SUMMARY OF THE INVENTION

Objects of the Invention

Principal objects of the invention are to provide a truck access step that can be easily suspended from either a vehicle bumper or a wheel of a vehicle and that, when so suspended will safely support the weight of even a heavy person.

Other objects are to provide a truck access step that can be folded into a compact, flat condition for storage; that is durable and that is as light as possible, consistent with the need to support even a heavy person.

Features of the Invention

Principal features of the present invention include a strong, durable platform, support links pivotally connected to and extending from opposite ends of the platform; hook arms projecting from the support links, and folding arms interconnecting the support links and the ends of the platform adjacent a rear edge of the platform. An adjustable length strap is interconnected between the hook arms to provide means for hanging the platform from the tire on a vehicle wheel.

Additional objects and features of the invention will become apparent to those skilled in the art to which the invention pertains, from the following detailed description and drawings.

THE DRAWINGS

In the drawings:

FIG. 1 is a perspective view of the step of the invention, shown mounted to a vehicle bumper;

FIG. 2, an end elevation of the step, taken on the line 2—2 of FIG. 1;

FIG. 3, a perspective view, with the step shown mounted to a vehicle wheel; and

FIG. 4, a top plan view of the step in a folded condition.

DETAILED DESCRIPTION

Figure 1:
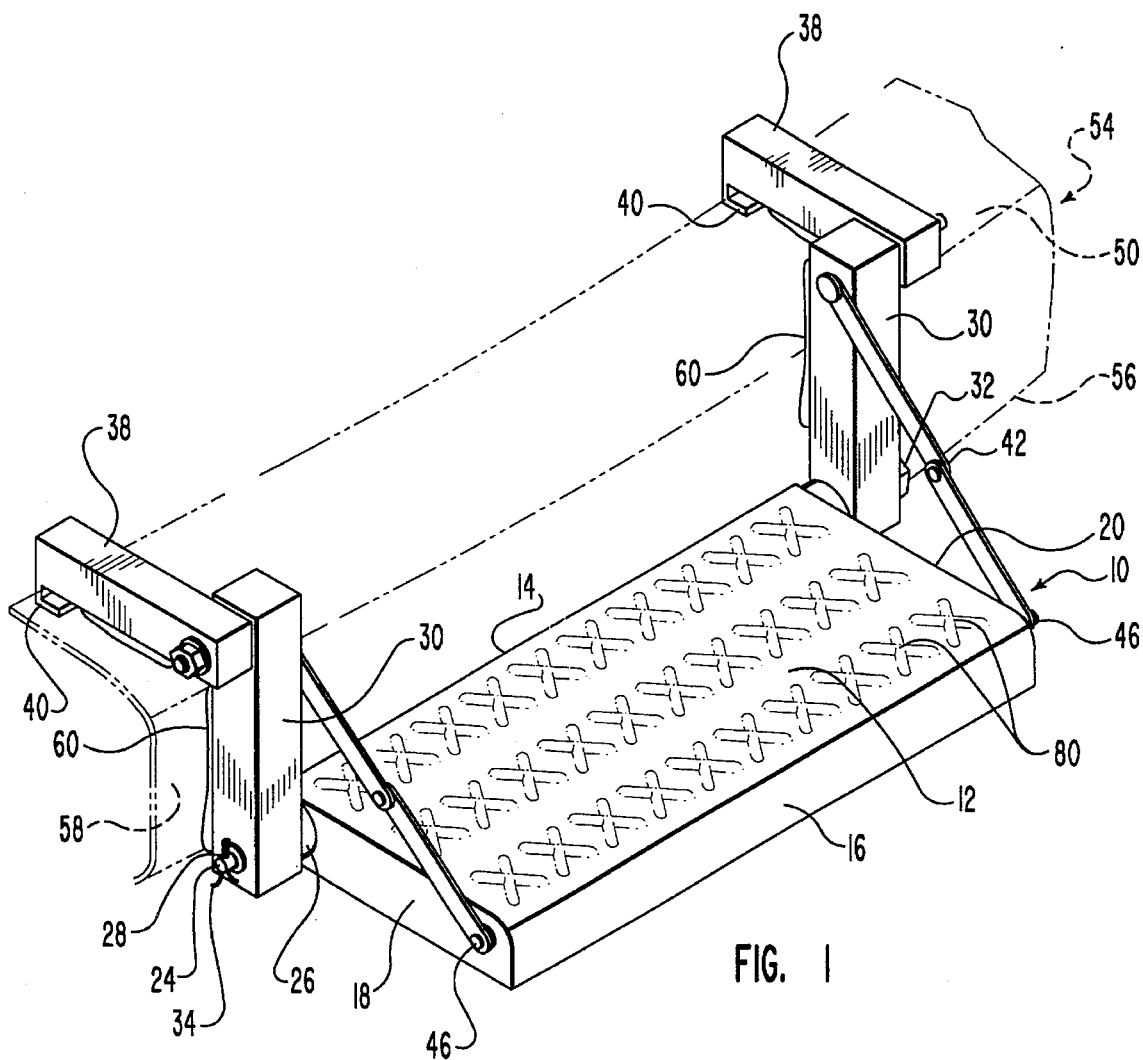
Figure 2:
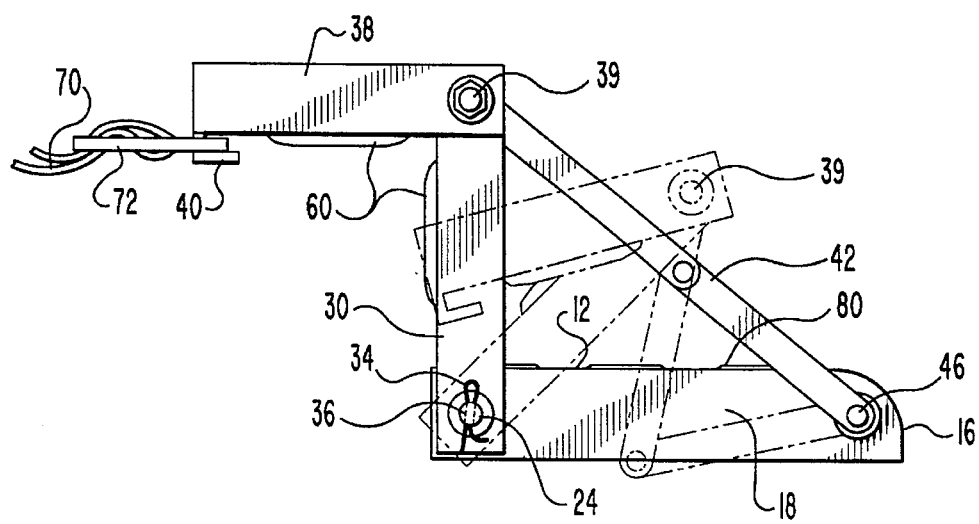
Figure 3:
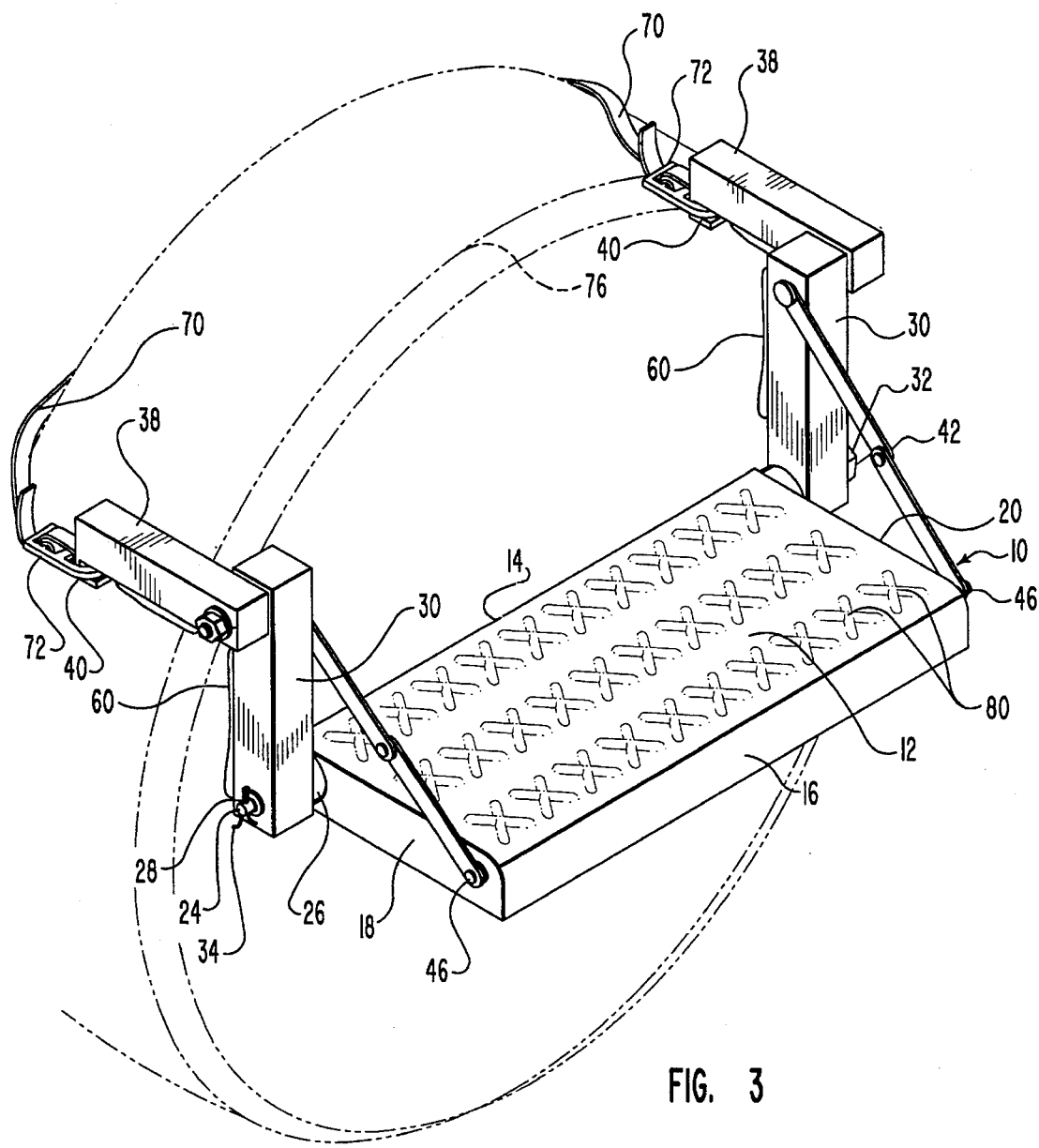
Figure 4:
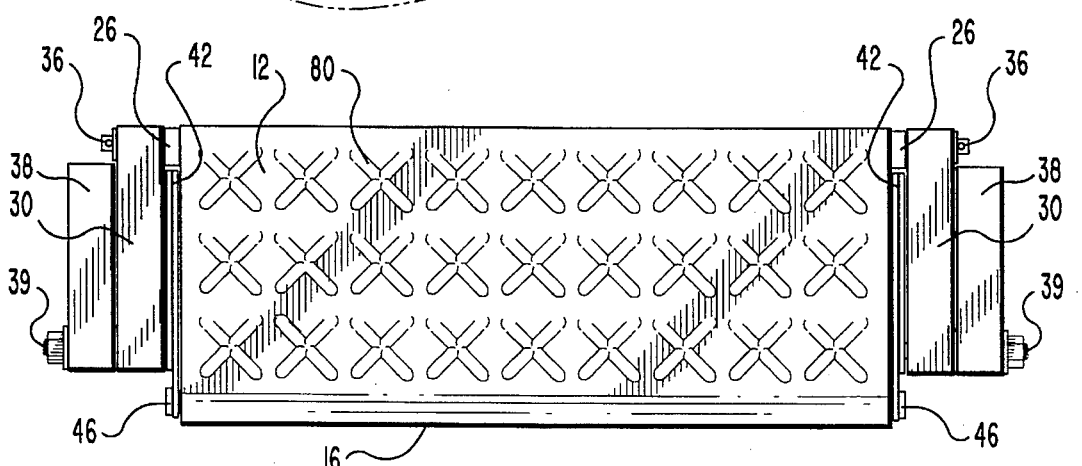

Referring now to the drawings:

In the illustrated preferred embodiment of the invention the access step is shown generally at 10.

Step 10 includes a platform 12 made of steel, aluminum or the like and having a downturned front edge 14, a downturned rear edge 16 and downturned side edges 18 and 20 interconnecting the front and rear edges, at opposite ends thereof. While shown as having a solid surface, it will be apparent the platform 12 can be constructed to have openings through the top surface, as a means of reducing the overall weight or reducing the cost of construction, or both, or even for other reasons.

A pivot pin 24 extends through each of the side edges 18 and 20, through a spacer washer 26, a hole 28 in an end of a support link 30 and a flat washer 32. A cotter pin 34 is inserted through a hole 36 in the end of the pivot pin to secure the pivot pin in place.

A hook arm 38 has one end pivotally connected by a bolt 39 that serves as a pivot pin that extending through the end of the support link 30 and through and beyond the arm 38 at the end of arm 38 remote from pivot pin 24. The other end of each hook arm has a hook 40 projecting therefrom.

Folding arms 42 each have one end pivotally connected on a pivot pin 39 to an inside of a link 30 and have an opposite end pivotally connected at 46 to a side edge 18 or 20 of the platform 12, adjacent to the rear edge 16 of the platform.

In use, the hooks 40 extend beneath the top edge of a front bumper, shown in phantom at 54. The hook arms 38 then extend over the top surface 50 of the bumper 54 and the support links 30 extend downwardly across the front face 58 of the bumper that terminates in lower bumper edge 56. Strips of rubber 60, or the like, bonded to links 30 and hook arms 38 prevent scratching of the bumper 54. Platform 12 projects from the bumper 54 or just beneath the bumper and normal to the support links 30 and are supported by the support links 30 and the folding arms 42. So positioned, with the step 10 hooked to the front bumper of a vehicle the platform is positioned to support and will carry the weight of a user standing on the platform.

A strap 70 has angled loop connectors 72 at opposite ends thereof and the loop connectors are made so that the length of the strap can be adjusted, if necessary.

In use, the loop connectors are fitted over the projecting ends of pivot pins 39 and the strap 70 is placed over a front wheel 76 (shown in phantom) of a vehicle. The strap 70 then extends as a cord across the back of the wheel and holds the step 12 in place, with support links 30 extending across an outer face of the wheel and with the platform extending normal to the face of the wheel and supported by the strap 70, links 30 and folding arms 42. With the step mounted to a front wheel of a vehicle a user can safely stand on platform 12 to more easily reach into the engine compartment from the side of the vehicle.

For storage purposes the folding arms 42 are moved to a folded position as the support links 30 and hook arms 38 are pivoted to extend parallel to the side edges 18 and 20 wherein the assembly is in a substantially flat condition.

Platform 12 preferably has roughened, non-skid top surface 80.

Also, if desired, the angled connectors 72 can be more permanently affixed to the ends of pivot pins 39 using nuts threaded on the ends of the pins 39.

While a presently preferred embodiment of the invention has been herein disclosed it is understood that variations are possible, within the scope of the hereinafter set forth claims, which claims define the scope of the invention.

I claim:

1. A truck access step comprising a platform;

hook means fixed to and projecting from opposite ends of said platform and including spaced apart support links extending normal to a top surface of said platform and spaced apart hook arms each having a hook on one end thereof and another end thereof pivotally connected to an end of a support link; and strap means releasably interconnecting said hook arms.

2. A truck access step as in claim 1, wherein said spaced apart support links are pivotally connected to said platform at opposite ends thereof and wherein said hook arms are pivotally connected to the ends of said support links remote from said platform, and at a side of each said support link opposite said platform.

3. A truck access platform as in claim 2, further including folding arms each having one end pivotally connected to the pivot connection between a support link and one said hook arm and another end pivotally connected to said platform at an end thereof.

4. A truck access platform as in claim 3, wherein each said pivot connection between said support links and said hook arms has an extension beyond each of said link and said arm and wherein each of said loop members on the ends of said strap fits over and is secured to one of said extensions.

* * * * *